United States Patent [19]
Atkins

[11] 3,852,889
[45] Dec. 10, 1974

[54] DEVICE FOR MAKING PERSPECTIVE DRAWINGS

[76] Inventor: Thomas W. Atkins, 425 E. 75th St., New York, N.Y. 10021

[22] Filed: Mar. 30, 1972

[21] Appl. No.: 239,827

Related U.S. Application Data

[63] Continuation of Ser. No. 39,005, May 20, 1970, abandoned.

[52] U.S. Cl. .................................. 33/277, 33/75 R
[51] Int. Cl. ........................................... B43l 13/16
[58] Field of Search ...... 35/26; 33/227, 1 M, 174 B, 33/104, 243, 276, 20 C, 77

[56] References Cited
UNITED STATES PATENTS

| | | | |
|---|---|---|---|
| D165,849 | 2/1952 | Jordon | 33/174 B X |
| 449,681 | 4/1891 | Lasar | 33/277 |
| 1,583,965 | 5/1926 | Dunn | 33/277 |
| 2,553,540 | 5/1951 | Beckerman | 33/243 |
| 2,192,148 | 2/1940 | Otto | 33/364 |
| 2,403,919 | 7/1946 | Hagner | 33/282 |
| 1,154,673 | 9/1915 | Van ness | 33/104 |
| 2,049,245 | 7/1936 | Bretbarth | 33/1 B |
| 2,474,466 | 6/1949 | Carling | 33/277 |
| 1,138,480 | 5/1915 | Humann | 33/277 |

FOREIGN PATENTS OR APPLICATIONS

| | | | |
|---|---|---|---|
| 724,592 | 1/1932 | France | 33/20 C |
| 422 | 1900 | Great Britain | 33/277 |
| 53,522 | 5/1912 | Austria | 33/276 |

Primary Examiner—Harry N. Haroian
Attorney, Agent, or Firm—Hubbell, Cohen & Stiefel

[57] ABSTRACT

A device for making a perspective drawing. The device is constructed of a material through which a scene to be drawn can be viewed. This device includes a planar base having a vertically extending framing edge which is provided with a means for orienting the planar base member in a vertical plane, such as a pair of spaced apart lines on transparent member and disposed in a plane perpendicular to the plane of said base member, and for orienting the framing edge to extend vertically, such as a plumb line or level bubble, so as to determine the horizon. A pair of orthogonal scales is provided on the base for indicating the relative position of portions of the scene with respect to the determined horizon. Means are also provided that have a straight edge portion which is rotatably mounted on the base and which extends across the base so as to be rotatable in the vertical plane to, thereby, be alignable with a line in the scene.

1 Claim, 4 Drawing Figures

PATENTED DEC 10 1974

3,852,889

INVENTOR
THOMAS W. ATKINS

BY Hubbell, Cohen & Stiefel

ATTORNEYS.

DEVICE FOR MAKING PERSPECTIVE DRAWINGS

This application is a continuation of application Ser. No. 39,005 filed 5/20/70 now abandoned.

BACKGROUND OF THE INVENTION

1. Field of the Invention

The present invention relates to devices for making perspective drawings and more particularly to a device for making perspective drawings which includes a means for determining a horizon for the perspective drawing.

2. Description of the Prior Art

The prior art perspective drawing devices, such as the group commonly termed focus drawing scales, contain an aperture for framing the object to be drawn and a rotatable degree indicator strip which bisects this aperture and which is utilized as a check means to make certain that the user has drawn a proper perspective line. It is critical in the operation of these devices, that a horizon be determined and that the device be held in an upright or vertical position with respect to the ground plane so that the degree indicator strip is rotatable in a vertical plane with respect to the horizon line. If this upright position is not accurately obtained for the device, then a true perspective picture cannot be drawn with the aid of the device. These prior art devices utilize the unaided human eye to determine when the device is in the upright position. Such determination is not consistent, as it is reliant solely on the function of the eye which may vary from moment to moment. Therefore, while these prior art devices may be helpful as an instructional tool in teaching the general concept of perspective, the inaccuracies present therein result in errors which produce distortions in the picture. These devices have, therefore, not enjoyed widespread use as aids in drawing accurate perspective drawings.

SUMMARY OF THE INVENTION

The device for making perspective drawings of a scene includes a planar base member which is provided with a vertically extending framing edge and means for orienting the planar base member in a vertical plane and for orienting the framing edge to extend vertically with respect to the ground plane. Means are also provided that have a straight edge portion extending across the base member and which is rotatably mounted on the base member so as to rotate in the vertical plane, whereby when the base member and the framing edge are oriented, the horizon is determined and the straight edge portion is alignable with a perspective line of the scene to be drawn.

DETAILED DESCRIPTION OF THE PREFERRED EMBODIMENTS

Figure 1:
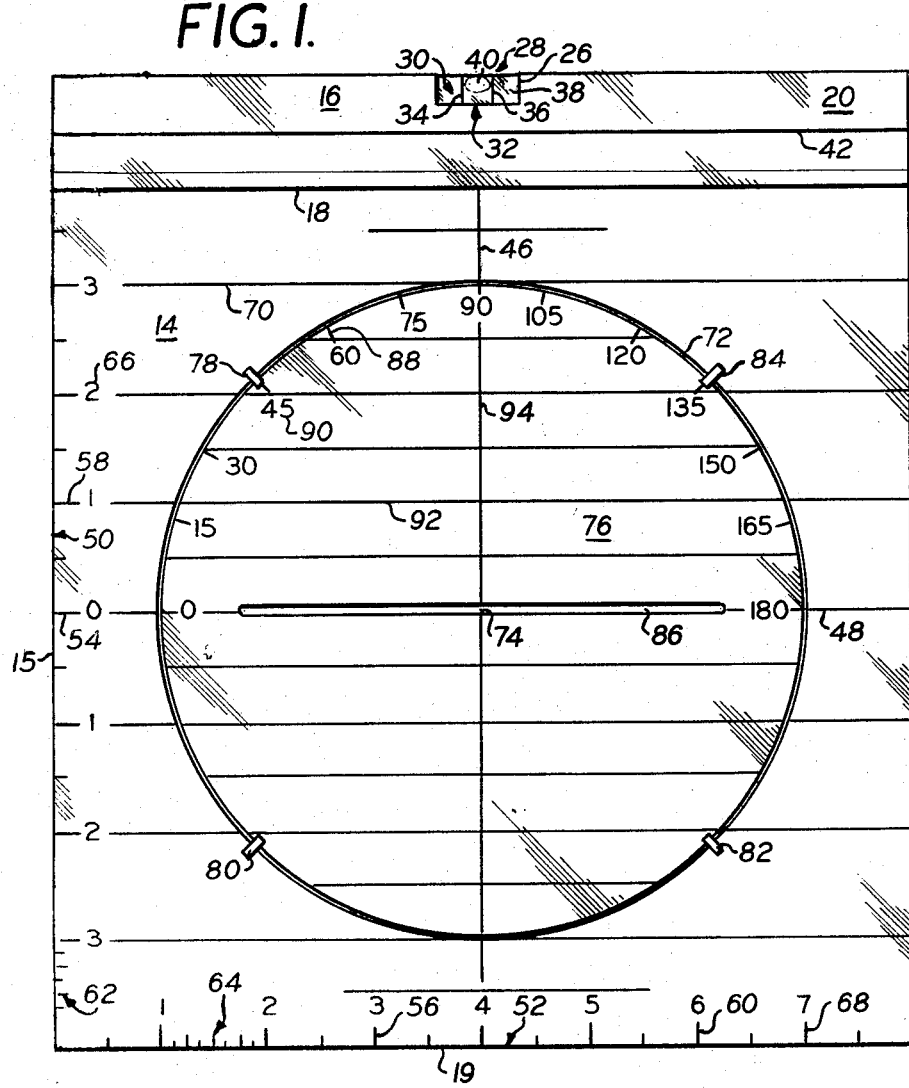
FIG. 1 is a front view of the preferred embodiment of the present invention.

Referring now to the drawing in detail, and particularly to FIG. 1, a perspective drawing device in accordance with the preferred embodiment of the present invention, generally referred to by the reference numeral 10, includes a planar base member 12, which is preferably constructed of a material permitting light to pass through, such as a clear plastic or some other transparent material for a purpose to be described in greater detail hereinafter. The base member 12, as shown and preferred, includes a framing portion 14 through which a scene to be drawn can be viewed. The framing portion 14, preferably has a rectangular configuration such as a square, although some other configuration could be utilized if desired, having a pair of vertically extendable framing edges 15 and 17 and a pair of edges 18 and 19 normal thereto. The base member 12 also includes an upstanding ledge portion 16 located at one end 18 of the framing portion 14, for a purpose to be described in greater detail hereinafter.

Figure 2:
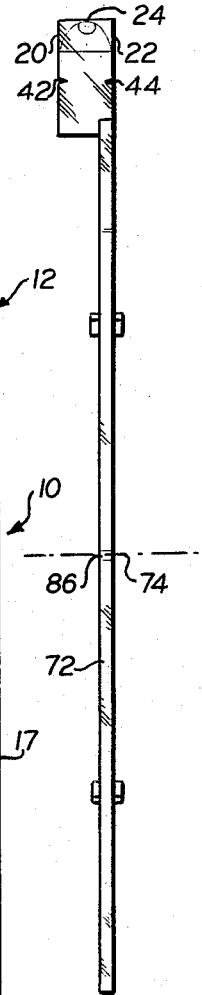
FIG. 2 is a side view of the embodiment shown in FIG. 1.

The upstanding ledge portion 16, as shown and preferred, includes a front and a rear face, 20 and 22, respectively, and a top face 24. A centrally located notched portion or recess 26 is located at the top of the ledge 16. A conventional level bubble device 28, is preferably fixedly mounted within the notched portion 26. As is well known, the level bubble device 28 comprises a capsule 30 having a central portion 32 which is defined by spaced apart parallel markings 34 and 36 with a liquid 38 filling the capsule 30 to slightly less than capacity so as to provide an air bubble 40 whose length is about equal to the spacing between lines 34 and 36. Clearly the position of the bubble 40 in the capsule 30 is variable, being dependent on gravity and the angular orientation of the capsule 30, and hence, the base 12. Preferably, a pair of parallel lines 42 and 44 (FIG. 2) are provided on the front and rear faces 20 and 22 respectively, as by scribing, the lines 42 and 44 being disposed in a plane that is perpendicular to the plane of base member 12 for a purpose to be described in greater detail hereinafter.

A vertical center line 46 and a horizontal center line 48 are provided on the framing portion surface 14, as by scribing, for a purpose to be described in greater detail hereinafter, with the level bubble device 28 being symmetrical about the line 46. Orthogonally related scales 50 and 52 are also provided on the framing portion surface 14 parallel to center lines 46 and 48, respectively. Each scale 50 and 52, as shown and preferred, is located at one edge of the rectangular configuration, for a purpose to be described in greater detail hereinafter, scale 50 being located at edge 15 and scale 52 being located at edge 19. Preferably, these scales 50 and 52 are of equal length, although they may be of different length if desired. As shown and preferred, each scale 50 and 52 consists of a plurality of equispaced indicia markings 54 and 56, respectively, the dimensional relationship of the indicia markings 54 and 56, preferably being identical.

As shown and preferred, each scale 50 and 52 has a plurality of major division indicia markings 58 and 60, respectively, and a plurality of subdivision indicia markings 62 and 64, respectively, between the respective major division indicia markings 58 and 60, illustratively being shown as comprising eight subdivision indicia markings 62 and 64 between each pair of major division markings, only two eight subdivision groupings 62 and 64 being shown for purposes of clarity. Furthermore, as shown and preferred, the scales 50 and 52 major division indicia markings 58 and 60 are accompanied on the surface 14 by numerical indicators 66 and 68, respectively, which, for purposes of illustration are 3, 2, 1, 0, 1, 2, 3, for scale 50, with 0 being at the location of the horizontal center line 48; and 1, 2, 3, 4, 5, 6, 7 for scale 52, with 4 being at the location of the vertical center line 46. As shown and preferred, a plurality of equi-spaced parallel guide lines 70 are provided, as by scribing, which extend across the framing portion surface 14 parallel to scale 52, from the major division indicia markings 58 of scale 50, for a purpose to be described in greater detail hereinafter.

Preferably, the framing portion 14 is formed with a centrally located aperture 72 disposed therein with the intersection of center lines 46 and 48 occurring at the center 74 of the aperture 72 which preferably has a circular configuration.

A planar member, which is preferably a disk 76 constructed of a material having the same light passage properties as the base member 12, is rotatably mounted on the framing portion 14, centrally located within the aperture 72, as by means of U-shaped guides, illustratively shown as four guides 78, 80, 82 and 84, spaced about the circular aperture periphery 72. The disk 76 preferably has a diameter which is slightly less than the diameter of the aperture 72 so as to permit rotation of the disk 76 within the aperture 72 to occur. Although not shown, if desired, the aperture 72 could be omitted and the disk 76 rotatably mounted in surface to surface relation with surface 14.

As shown and preferred, the disk 76 is formed with a diametral slot 86 for a purpose to be described in greater detail hereinafter. Preferably, and as illustrated, a plurality of equi-spaced indicia markings 88 are spaced about one-half of the disk 76 periphery, for a purpose to be described in greater detail. These markings 88 are illustratively shown as being accompanied by numerical indicators 90 spaced apart at intervals representing 15° from 0° to 180° inclusive, which are located on the upper half of the disk 76 when the disk 76 is oriented as shown in FIG. 1, with the 0 and 180 indicators 90 being at opposite ends of diametral slot 86. The disk surface 76 preferably includes a plurality of scribed lines 92 which match up with the guide lines 70 and the horizontal center line 48, and a scribed line 94 which matches up with the vertical center line 46, when the disk 76 is oriented as shown in FIG. 1, for a purpose to be described in greater detail hereinafter.

OPERATION

The operation of the perspective drawing device 10 is as follows. In order to establish the picture's horizon, which is commonly defined as the horizontal line at eye level, the perspective drawing device 10 is held in front of the eye with the framing portion 14 and ledge 16 facing the observer, and the ledge 16 at the top so that the parallel spaced apart lines 42 and 44 cut across the field of vision. The scene to be drawn is viewed through the framing portion 14. In order to determine if the device 10 is properly oriented in a vertical plane with markings 42 and 44 horizontal, the device 10 is moved until the level bubble 40 is between the lines 34 and 36 of the central portion 32. At this point the device 10 is level, that is lines 42 and 44 are horizontal. However, the device 10 may be disposed in any plane which includes the horizon. In order to orient it in the vertical plane, which as will be understood hereinafter is necessary to the proper use of the device 10, the observer rotates the device 10 about the central axis of ledge 16 until the parallel spaced apart lines 42 and 44 appear to coincide so that only one line 42 is visible. At this point the device 10 is upright and properly aligned with the scene to be drawn, whose horizon is now accurately determined by the coincident lines 42 and 44. The observer then notices the relationship of selected landmarks relative to this horizon in the scene to be drawn. He then draws a horizon reference line on a piece of paper. If he wishes to show more of the scene above the horizon he draws the horizon reference line low on the paper, and if he wishes to show more of the scene below the horizon, he draws the horizon reference line high on the paper. The observer then proportions the size of his picture within a rectangular configuration by outlining the total height and width of his drawing on the paper and then dividing the bottom edge of the width outline into units corresponding to scale 52 and a vertical edge of the height outline into units corresponding to scale 50, with 0 at the horizon reference line. Each main division 58 and 60 is preferably divided into subdivisions corresponding to the scale subdivisions 62 and 64.

The observer then determines the area of the scene to be drawn by holding the device 10 across his field of vision, not necessarily level, and looking through the framing portion 14 at the scene to be drawn. The observer then moves the device 10 toward and away from himself until the total scene to be drawn is completely framed within the framing portion 14, the sides of the device 10 constituting the width of the picture. These limiting points are then marked on the horizon reference line.

The observer then aligns the device 10 in his field of vision with the horizontal center line 48 coinciding with the previously determined horizon in the scene to be drawn, and the edges 15, 17, 18 and 19 of the device 10 framing the scene. The observer then sights the relative horizontal distances of objects and points in the scene to be drawn utilizing scale 52 and proportionally transfers these distances to the paper. He then sights the relative vertical distances of objects and points in the scene to be drawn, in the same manner, utilizing scale 50 and guide lines 70. The center lines 46 and 48 are utilized respectively, as the center lines of the picture being drawn. The horizontal and vertical distances are plotted as points in the picture and are utilized as guides for drawing lines appearing in perspective in the scene.

To determine the angle of a perspective line, the observer again holds the device 10 level in his field of vision and rotates the disk 76 until the straight edge diametral slot 86 is aligned with the perspective line in the scene to be drawn. He then places the device 10 on the paper with the horizontal center line 48 aligned with the horizon reference line and the vertical center line 46 bisecting this line between the limiting points. The observer then moves the device 10 until the perspective line defined by the diametral slot 86 passes through a previously determined vertical and horizontal distance point, which is at the intersection of these two planes associated with this line and draws the line by placing a writing instrument in the slot 86 and using the slot 86 as a guide. the end points of the perspective line are determined by the points of intersection of this perspective line with the corresponding associated previously determined vertical and horizontal distance points. This procedure is repeated for all perspective lines in the scene and the corresponding lines and determined points are connected to draw an accurate perspective view of the scene.

If desired, the markings 66 and 68 on the scales 50 and 52, respectively, and the markings 90 on the disk 76, can be utilized to provide data for a perspective view which can be drawn at a subsequent time, by recording the respective readings when the device 10 is utilized in the manner described above.

Figure 4:
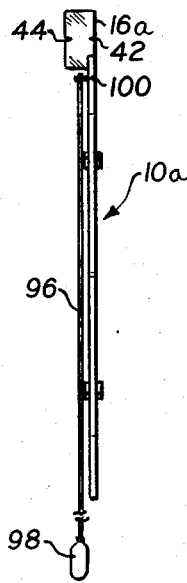
FIG. 4 is a side view of an alternative embodiment of the present invention.

An alternative embodiment of the present invention is shown in FIG. 4, which is a side view of the device 10a and which is identical in structure and manner of operation with the previously described embodiment of FIG. 1, except that in lieu of level bubble indicator device 28 a plumb line 96 is provided. The plumb line 96 is a conventional device having a weight 98 at one end thereof. The other end of the plumb line 96 is preferably attached to the base 12 at only one point 100, which is preferably located along the center line 46. As is well known the plumb line 96 is responsive to the force of gravity so as to hang normal to the earth's surface, or ground plane at all times.

Figure 3:
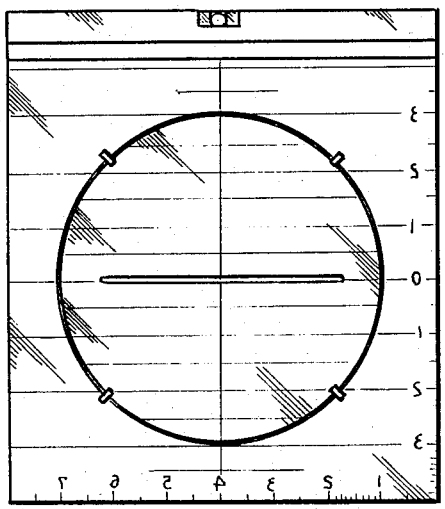
FIG. 3 is a rear view of the embodiment shown in FIG. 1.

In utilizing this embodiment, the device 10a is oriented until lines 42 and 44 are coincident and the vertical center line 46 coincides with the plumb line 96. At this point the device 10a is a vertical plane. The parallel scribed lines 42 and 44 on ledge 16a define the location of the horizon in the scene to be drawn, as previously described with reference to the preferred embodiment shown in FIGS. 1–3. At this point the device 10a is upright and properly aligned with the scene to be drawn, whose horizon is now accurately determined. The remainder of the operation of the device 10a is identical with the operation and manner of use of the previously described preferred device 10.

By utilizing the present invention, an accurate perspective spective view of a scene may be drawn in a relatively simple manner.

As used herein throughout the specification, the term "ground plane" is defined as an imaginary flat plane across the earth's surface at sea level, and the term "vertical plane" is defined as a plane normal to the ground plane.

It is to be understood that the above described embodiments of the invention are merely illustrative of the principles thereof and that numerous modifications and embodiments of the invention may be derived within the spirit and scope thereof.

What is claimed is:

1. A graphic aid for drawing a perspective drawing of a scene, comprising:
   a transparent planar base member having a vertically extending frame edge, said base member having a pair of horizontal parallel lines thereon, one line being on each of the front and back surface and said lines defining a plane perpendicular to the plane of said base member whereby to provide means for orienting said planar base member normal to the line of sight, said base member having a circular aperture therein;
   a transparent circular member rotatably mounted in said aperture and having an elongated slot along a portion of a diameter thereof to define a straight edge alignable with a perspective line of said scene, said rotatably mounted member including means associated therewith for indicating the relative angle of rotation of said straight edge in the plane of said base member from a reference position;
   a horizontal bubble level fixed to said base member for orienting said parallel lines horizontal;
   said base member further comprising a rectangular framing portion including a pair of orthogonal means for indicating the relative position of said perspective line with respect to a horizon;
   said transparent circular member having a vertical and a horizontal axis and being rotatably mounted with said vertical and horizontal axes substantially disposed along paths which respectively bisect said orthogonal means when said straight edge portion horizontal axis is aligned with one of said paths, said horizontal axis being parallel to the horizon;
   said orthogonal means each including a plurality of equispaced indicia, one of said orthogonal means being disposable parallel to said horizontal axis, the other of said orthogonal means being disposable parallel to said vertical axis, said vertical disposable orthogonal means including a plurality of spaced apart guide lines parallel to said horizontal disposable orthogonal means including a plurality of spaced apart guide lines parallel to said horizontal disposable orthogonal means.

* * * * *